United States Patent [19]

Kokumai et al.

[11] Patent Number: 5,709,944
[45] Date of Patent: Jan. 20, 1998

[54] POLYTETRAFLUOROETHYLENE MOLDING POWDER

[75] Inventors: Masuo Kokumai; Yukinaru Nakamura; Mitsuru Kishine; Tetsuo Kitahaba; Hirokazu Yukawa; Kazuhide Sawada, all of Settsu, Japan; Sang Bong Han, Seoul, Rep. of Korea; Tetsuo Shimizu; Takahisa Aoyama, both of Settsu, Japan

[73] Assignee: Daikin Industries, Ltd., Osaka, Japan

[21] Appl. No.: 468,652

[22] Filed: Jun. 6, 1995

Related U.S. Application Data

[62] Division of Ser. No. 129,061, Nov. 15, 1993, abandoned.

[30] Foreign Application Priority Data

| Feb. 5, 1992 | [JP] | Japan | 4-19998 |
| May 7, 1992 | [JP] | Japan | 4-114443 |
| May 20, 1992 | [JP] | Japan | 4-127348 |
| Jun. 25, 1992 | [JP] | Japan | 4-167519 |

[51] Int. Cl.$^6$ ................................ B32B 5/16
[52] U.S. Cl. ................... 428/402; 526/247; 526/255
[58] Field of Search ................ 428/402; 526/247, 526/255

[56] References Cited

U.S. PATENT DOCUMENTS

| 2,393,967 | 2/1946 | Brubaker | 230/80 |
| 3,331,822 | 7/1967 | Kametani et al. | |
| 3,953,412 | 4/1976 | Saito et al. | 526/247 |
| 4,036,802 | 7/1977 | Poirier | |
| 4,078,134 | 3/1978 | Kuhls et al. | |
| 4,078,135 | 3/1978 | Sulzbach et al. | |
| 4,123,606 | 10/1978 | Malhotra | 528/499 |
| 4,379,900 | 4/1983 | Sulzbach | |
| 4,898,799 | 2/1990 | Yoshimura et al. | 428/402 |
| 5,153,285 | 10/1992 | Felix et al. | |
| 5,176,958 | 1/1993 | Shimizu et al. | 428/402 |
| 5,284,708 | 2/1994 | Shimizu et al. | 428/402 |

FOREIGN PATENT DOCUMENTS

| 0272659 | 6/1988 | European Pat. Off. |
| 53-139660 | 5/1977 | Japan |
| 1116210 | 6/1968 | United Kingdom |
| 1442448 | 7/1976 | United Kingdom |

OTHER PUBLICATIONS

"Modified TFE polymer as powder with a high bulk density and good flow properties" Sulzbach Mar. 1981, DE8/-3110193 abstract, pp. 66, 67.

"TFE copolymers for pressurefree sintering" Felix et al, DE93-4335705, Oct. 1993 pp. 46, 47 abstract.

"Preparation of perfluoroalkylvinylether tetrafluoroethylene copolymers with thermal disobration resistance"Felix et al, DE93-4332712 abstract, pp. 47,48.

"Aqueous suspension polymerization of TFE" Felix et al., DE90-4022405 abstract, pp. 53 and 54.

International Search Report for International Appln. No. PCT/JP93/00140.

International Search Report for International appln. No. PCT/JP93/00140 Supplementary European Search Report for Appln. No. EP 93 90 3310 dated Jun. 6, 1994.

Primary Examiner—Joseph L. Schofer
Assistant Examiner—N. Sarofim
Attorney, Agent, or Firm—Varndell Legal Group

[57] ABSTRACT

Polytetrafluoroethylene molding powder which comprises 0.01 to 1% by weight of a perfluoro(vinyl ether) unit and which has a heat of crystallization of 18.0 to 25.0 J/g. The molding powder provides a molded article which has a flex life of not less than 7 million cycles, a creep resistance (total deformation at 200° C.) of not more than 20%, and a creep resistance (total deformation at 25° C.) of not more than 15%. The polytetrafluoroethylene molding powder which is excellent in both creep resistance and flex fatigue resistance is provided as a molding material for parts which are repeatedly bent such as pump.

6 Claims, 2 Drawing Sheets

POLYTETRAFLUOROETHYLENE MOLDING POWDER

CROSS-REFERENCE TO RELATED APPLICATIONS

This is a divisional application of International Application No. PCT/JP93/00140, filed Feb. 4, 1993, which entered the national phase and was assigned U.S. Ser. No. 08/129,061, filed on Nov. 15, 1993, now abandoned.

TECHNICAL FIELD

The present invention relates to a polytetrafluoroethylene (which may be hereinaftrer referred to as "PTFE") molding powder which is used to obtain a molded article having an improved flex fatigue resistance, a process for preparing the same and a pelletized powder made of the same.

BACKGROUND ART

A suspension-polymerized polymer of tetrafluoroethylene (TFE) is excellent particularly in chemical resistance and heat resistance, and is used as a molding material for a variety of molded articles, though the suspension-polymerized polymer is not melt-processable. Among such molded articles, articles which are bent repeatedly such as pump, bellows and diaphragm are required to have simultaneaously flex fatigue resistance (flex life) and creep resistance.

A molded article made of homopolymer powder of TFE has an inferior creep resistance though the article has a sufficiently long flex life (e.g. with regard to M-12 made by Daikin Industries, Ltd., a flex life is 7.2 million cycles and a creep resistance ( 200° C., load: 70 kgf/cm$^2$, total deformation) is 26.7%). Therefore, the homopolymer powder of TFE is not a fully satisfactory polymer as materials for molded articles which are required to have a high strength under a high load.

Known as one method to improve this creep resistance, is to add inorganic and organic various filling materials (fillers), namely, glass fiber, carbon powder, graphite, molybdenum disulfide, bronze, polymide, polyamideimide, polyphenylene oxide, polyallylene sulfide and the like (JP-A-24252/1977). Though the addition of the fillers improves the creep resistance, problems such as coloring and discoloration occur in molding process because of impurities derived from the fillers, or problems such as increase of osmosis or permeation of liquid or gas through the molded article because of the formation of voids due to the addition of fillers.

To improve these problems, there are disclosed methods in which various additives are added or the fllers are surface-treated in JP-B-18696/1985, JP-B-21178/1985, JP-B-57093/1990 and the like. However, such methods cannot solve completely the problems due to the fillers, and increase the number of process steps and costs for production.

Known as the other method to improve the creep resistance, is to copolymerize TFE with a modifier such as perfuluoro( alkyl vinyl ether), or perfluoro(alkoxyalkyl vinyl ether) (JP-B-46794/1976, JP-B-31524/1984). These methods try to improve the creep resistance with keeping melt-unprocessability by copolymerization with the reforming agent. JP-B-46794/1976 discloses a preparation of polytetrafluoroethylene by copolymerization with perfluoro(alkyl vinyl ether) in 0.02 to 0.26% by weight. Actually, the copolymerization is carried out at 65° C. in the case of perfluoro(propyl vinyl ether), and the product has a melt viscosity of 1×10$^9$ poise and a standard specific gravity of 2.175 to 2.186. Also, in the case of perfluoro(methyl vinyl ether), the copolymerization is carried out at a high copolymerization temperature of 65° C. and a high initiator concentration of 100 to 225 ppm, and the resulting polytetrafluoroethylene has a lower molecular weight than the homopolymer.

This polytetrafluoroethylene has a problem that the flex fatigue resistance (flex life) of the molded article is lowered, while the creep resistance is improved in comparison with the homopolymer of TFE.

As products of such a polytetrafluoroethylene, for example, TFM-1700 (Farbwerke Hoechst Aktien Gesellschaft) and TG-70J (Du pont-Mitsui Fluorochemicals Co., Ltd.) are commercially available. When measuring the flex fatigue resistance (flex life), the creep resistance and the like of the molded articles of these products, though the creep resistance is improved, the flex fatigue resistance is lowered in comparison with the homopolymer of polytetrafluoroethylene.

Further, JP-B-31524/1975 discloses copolymerization of TFE with perfluoro(alkyl vinyl ether) in 0.0004 to 0.0029% by mole. However, the content of perfluoro(alkyl vinyl ether) is not sufficient to improve the creep resistance.

With respect to relation of the flex ilfe and the creep resistance of polytetrafluoroethylene molded article, there is a general tendency that the creep resistance decreases when the flex life is improved and the flex life is shortened when the creep resistance is improved. However, the inventors have found the specific characteristics that the decrease of the creep resistance can be controlled even if the flex life is improved, when a perfluoro(alkyl vinyl ether) content and a heat of crystallization are within the particular ranges, and have completed the present invention.

It is an object of the present invention to provide a molding powder for obtaining a polytetrafluoroethylene molded article which has both the creep resistance and the flex fatigue resistance (flex life) simultaneously.

DISCLOSURE OF THE INVENTION

The polytetrafluoroethylene molding powder according to the present invention is a polytetrafluoroethylene molding powder which is not melt-processable and which has a specific surface area of 0.5 to 0.9 m$^2$/g and an average particle size of not more than 100 μm, characterized in that the polytetrafluoroethylene comprises 0.01 to 1% by weight, preferably 0.03 to 0.20% by weight of a perfluoro(vinyl ether) unit having the general formula (I):

$$-CF_2-CF- \atop | \atop O-X \qquad (I)$$

wherein X is a perfluoroalkyl group having 1 to 6 carbon atoms or a perfluoroalkoxyalkyl group having 4 to 9 carbon atoms, and has a heat of crystallization of 18.0 to 25.0 J/g, preferably 18.0 to 23.5 J/g measured by a differential scanning calorimeter, and that a molded article made of the powder has (a) a flex life of not less than 7 million cycles, (b) a creep resistance (total deformation) of not more than 20% at 200° C., and (c) a creep resistance (total deformation) of not more than 15% at 25° C.

The molding powder is obtained by suspension polymerization of tetrafluroethylene and a perfluoro(vinyl ether) having the general formula (II):

$$CF_2=CF-O-X \qquad (II)$$

wherein X is as defined above, at a temperature of 40° to 55° C. by using a persulfate as an initiator.

BEST MODE FOR CARRYING OUT THE INVENTION

Examples of the perfluoro(vinyl ether) (II) used are a perfluoro(alkyl vinyl ether) such as perfluoro(methyl vinyl ether), perfluoro(ethyl vinyl ether), perfluoro(propyl vinyl ether), perfluoro(butyl vinyl ether), perfluoro(pentyl vinyl ether) or perfluoro(hexyl vinyl ether); a perfluoro (alkoxyalkyl vinyl ether) such as perfluoro(2-methoxypropyl vinyl ether) or perfluoro(2-propoxypropyl vinyl ether) and the like. A content of these perfluoro(vinyl ether) units in PTFE is 0.01 to 1% by weight, preferably 0.03 to 0.20% by weight. When the content is too low, the creep resistance decreases. When the content is too high, the tensile strength and the crack resistance decrease, and the improvement of creep resistance is not so enhanced despite of using a large amount of expensive perfluoro vinyl ethers, resulting in economical disadvantages.

Suspension polymerization is carried out under polymerization conditions which suffice the above-mentioned characteristics. It is very important to adequately regulate a polymerization temperature, and a kind of initiator and an initiator concentration.

Generally, suspension polymerization of tetrafluoroethylene with perfluoro(vinyl ether) has been carried out at a polymerization temperature of 0° to 100° C. by using an organic or inorganic peroxide type initiator or a redox type inintiator at a relatively high concentration of the initiator. Both of such conditions are required to be lowered for obtaining polytetrafluoroethylene having a high molecular weight. However, the regulation and combination of those conditions are unexpectedly difficult in industrial scale.

In the present invention, polymerization conditions are adopted in which a persulfate preferably having a half life between 18 to 120 hours at 55° C. is used as an initiator, a polymerization temperature is controlled at 40° to 55° C. and, more preferably, a charge amount of the initiator is such an amount that a decomposition amount of the initiator during three hours from the beginning of the polymerization is $4\times10^{-7}$ to $8\times10^{-6}$ mole/liter in terms of a concentration on the basis of polymerization water. When the half life of the initiator is shorter than 18 hours or the decomposition amount of the initiator during three hours from the beginning of the polymerization is greater than $8\times10^{-6}$ mole/liter, the molecular weight does not increase, and when the half life is longer than 120 hours or the decomposition amount is smaller than $4\times10^{-7}$ mole/liter, the condition are not proper for industrial scale, since the polymerization rate is too slow.

Examples of the persulfate are ammonium persulfate (APS), patassium persulface (KPS) and the like.

In the polymerization, it is preferable to dissolve a buffer such as ammonium carbonate in the polymerization water for keeping a pH of the polymerization water within a basic pH range to prevent a polymerization vessel from corrosion as little as possible.

Further, when occasion demands, the polymerization may be carried out by adding a telogenically inactive dispersing agent such as a salt of a perfluorocarboxylic acid, for example, ammonium perfluorooctanoate, ammonium perfluorononanoate or the like in an amount of 1 to 200 ppm on the basis of the polymerization water. As a result of the polymerization with a small amount of the dispersing agent is added in this way, a specific surface area of the resulting powder is enlarged (5.0 to 9.0 m²/g), and a pressure transferability is improved in the molding. Further, molded articles made of this is powder well dense and also has excellent electric properties.

The polymerization time is about 8 to 25 hours. The resulting polytetrafluoroethylene has a high molecular weight and has a heat of crystallization of 18.0 to 25.0 J/g, preferably 18.0 to 23.5 J/g measured by a differential scanning calorimeter described hereinafter. The resulting polytetrafluoroethylene has usually a melt viscosity (380° C.) of about $5.0\times10^9$ to $1\times10^{11}$ poises, preferably $5.0\times10^9$ to $7.0\times10^{10}$ poises.

The polytetrafluoroethylene raw powder obtained by the suspension polymerization is dried and ground in a usual way to get a molding powder having a specific surface area of 0.5 to 9.0 m²/g and an average particle size of not more than 100 μm, preferably not more than 50 μm. This molding powder can be processed as it is by a usual moding method for polytetrafluoroethylene to provide molded articles having the above-mentioned performances. As the molding method, there may be employed usual methods such as compression molding, ram extrusion molding and isostatic molding.

The resulting molded article has (a) a heat of crystallization which is approximately the same as that of the molding powder, measured by a differential scanning calorimeter, (b) a flex life of not less than 7 million cycles, preferably not less than 10 million cycles, (c) a creep resistance (total deformation) at 200° C. of not more than 20%, and (d) a creep resistance (total deformation) at 25% of not more than 15%.

Further, the resulting molded article has a feature that SVI (stretching void index) is low. SVI is a physical property described in Item 10.9 of ASTM D4895-89 which is an index of the difference between a specific gravity of the molded article before tensile test and a specific gravity of the molded article after tensile test. This is regarded as a numerical value which represent an amount of the voids produced by stretching the molded article. That is to say, smaller the SVI value is, the void is more difficult to be formed under tension. The molded article made of the polytetrafluoroethylene powder according to the present invention has a SVI value of not more than 50, preferably not more than 40.

The polytetrafluoroethylene molded article having such performances has not yet been known until now, and can be provided by the present invention for the first time.

The polytetrafluoroethylene molding powder of the present invention may also be pelletized by known agglomeration methods. The agglomeration can be carried out, for example, by homogeneously mixing with stirring the molding powder in a two phase liquid medium comprising water and an organic liquid having a surface tension of not more than about 40 dyne/cm at 25° C. Examples of the organic liquid are, an aliphatic hydrocarbon such as pentane or dodecane; an aromatic hydrocarbon such as benzene, toluene or xylene; a halogenated hydrocarbon such as tetrachloroethylene, trichloroethylene, chloroform, chlorobenzene, trichlorotrifluoroethane, monofluoro trichloromethane or difluorotetrachloroethane; and the like. Among them, the halogenated hydrocarbon is preferable, and a chlorinated hydrocarbon or a fluorinated hydrocarbon such as 1,1,1-trichloroethane, 1,1-dichloro-2,2,3,3,3-pentafluoropropane, 1,3-dichloro-1,1,2,2,3-pentafluoropropane, 1,1-dichloro-2,2,2-trifluoroethane or 1,1-dichloro-1-fluoroethane is particularly preferable, because they are nonflammable and suffice a requirement of such a Ozone problem or the like. These organic liquids may be used alone or in combination of two or more.

An apparent density of the resulting pelletized powder is 2 to 3 times higher than that of the primary molding powder before the agglomeration, and the pelletized powder is excellent in flowability and handling. Therefore, the pelletized powder is adequate also for automatic compression molding. More specifically, the pelletized powder has (a) an average particle size of 150 to 1000 μm, (b) an apparent density of 0.5 to 1.0 g/cm$^2$, and (c) a particle size distribution in which not less than 30% by weight, preferably 35 to 45% by weight of the powder has a particle size 0.7 to 1.3 times larger than the average particle size. Within the range of 35 to 45% by weight, the apparent density tends to be higher than the other cases.

Further, the molded article made of the pelletized powder has (d) a flex life of not less than 5 million cycles, and (e) a SVI of not more than 50.

The pelletized powder according to the present invention is also excellent in welding and electric insulation. It is known that a polytetrafluoroethylene powder comprising a perfluoro(vinyl ether) unit has an excellent welding and electric insulation. The welding and the electric insulation can be measured by using the evaluation methods described in JP-B-39105/1991 described hereinafter.

Further, the polytetrafluoroethylene molding powder of the present invention may be optionally admixed with a filler. The molding powder admixed with the filler may be pelletized in a known agglomeration method.

The filler for admixing is not particularly restricted, and an admixing amount of the filler is such that a ratio by weight of polytetrafluoroethylene (PTFE)/filler is 20 to 99/80 to 1, preferably 30 to 99/70 to 1. Specifically, non-restricted examples are, for instance, glass fiber (3 to 30% by weight: admixing amount, hereinafter the same), graphite powder (3 to 30% by weight), bronze powder (10 to 80% by weight), gold powder (10 to 80% by weight), silver powder (10 to 80% by weight), copper powder (10 to 80% by weight), stainless steel powder (3 to 50% by weight), stainless steel fiber (3 to 50% by weight), nickel powder (3 to 50% by weight), nickel fiber (3 to 50% by weight), molybdenum disulfide powder (3 to 30% by weight), cokes powder (5 to 30% by weight), carbon fiber (3 to 30% by weight), aromatic heat resistant resin powder such as polyoxybenzoylpolyester (5 to 30% by weight), boron nitride powder (1 to 20% by weight), polyimide powder (5 to 30% by weight), tetrafluoroethyleneperfluoro(alkyl vinyl ether) copolymer (PFA) powder (5 to 30% by weight), fluorinated mica powder (5 to 40% by weight), carbon black (1 to 30% by weight), polyphenylene sulfide powder (1 to 30% by weight), mixture thereof, and the like. Further, the filler may be surface-treated with a PTFE dispersion or a silane coupling agent. When two or more fillers are used, preferable combination is glass fiber and graphite powder, glass fiber and molybdenum dsiulfide powder, bronze powder and molybdenum disulfide powder, bronze powder and carbon fiber, graphite powder and cokes powder, graphite powder and aromatic heat resistant resin powder, carbon fiber and aromatic heat resistant resin powder, or the like. The mixing method may be either wet method or dry method.

The polytetrafluoroethylene molding powder of the present invention may be admixed with usual additives, in addition to other than the above-mentioned filler, for example, a colorant, an antistatic agent, and the like.

Because of its excellent characteristics, the molding powder according to the present invention is useful as it is or after blending with the filler, as a raw material for molded articles for the following uses. For example, molded articles which need a flex fatigue resistance such as bellows, diaphragm, hose, piston ring and butterfly valve; molded articles which need a creep resistance such as ball valve sheet, packing, gasket, piston ring, bellows, disphragm and butterfly valve; molded articles which need a gas permeation resistance such as bellows, diaphragm, hose, packing and gasket; and the like.

Among them, the molding powder of the present invention is particularly adequate for a bellows and a diaphragm of chemical pump which needs chemical resistance, flex fatigue resistance, creep resistance and gas permeation resistance. The chemical pump is used in chemical industry and semiconductor manufacturing apparatus to transfer strongly corrosive fluids, for example, gases such as fluorine, hydrogen chloride, sulfur oxide, nitrogen oxide and phosgene; a liquid such as hydrogen fluoride, hydrochloric acid, sulfuric acid, nitric acid, phosphorus oxychloride, thionyl chloride, sulfuryl chloride, chromic acid, other various organic acids and acid halides. Until now, polytetrafluoroethylene is used as a material for molding for a bellows and a diaphragm which are flexible and movable parts of the above-mentioned chemical pump mainly due to a chemical resistance of polytetrafluoroethylene (JP-A-32422/1972, JP-A-2320/1973, JP-A-151465/1985, JP-A-116303/1989). However, all of these prior arts relate to improvements of structures of apparatuses into which a bellows and a diaphargm are incorporated, and do not relate to an improvement of the flex fatigue resistance and the creep resistance. An example for improving the creep resistance is disclosed in JP-A-127976/1986 in which a melt-processable perfluoro (alkyl vinyl ether) copolymer is mixed in polytetrafluoroethylene. However, the flex fatigue resistance is not improved in this example.

As mentioned above, the molded article of the present invention is excellent in both creep resitance and flex fatigue resistance, and also in gas permeation resistance. Therefore, a chemical pump comprising a bellows and a diaphragm of the present invention is an excellent pump which is maintenance-free and can be used for a long time.

The molding powder mixed with the filler is particularly preferably used for molded articles which need a creep resistance at a high temperature and an abrasion resistance. However, the use is not limited to them. Specifically, examples are piston ring, sealing material for power steering, various mechanical sealing materials, bearing, gasket, valve sheet, packing, bearing pad and the like. The molding powder mixed with the filler is particularly suitable for sliding parts and sealing materials of automobiles. A method for molding them may be the same as that for a conventional PTFE powder which is not melt-processable. Examples are (automatic) compression molding, ram extrusion molding, isobaric pressure molding and the like.

Further, because a particular PTFE having a low heat of crystallization itself is excellent in abrasion resistance, physical properties (such as tensile strength, elongation and the like) of the molded article can also be improved by decreasing an amount of the filler.

Measuring methods for the measured values described in the specification are explained hereinbelow.

(Measurement of perfluoro(vinyl ether) content)

The content is calculated from characteristic absorptions (between 1040 cm$^{-1}$ to 890 cm$^{-1}$ in the case of perfluoro (propyl vinyl ether)) in infrared spectroscopy.

(Measurement of average particle size)

An average particle size is measured during a vibration time of 10 minutes according to JIS K 6891-5.4.

(Measurement of particle size distribution)

This is a proportion by weight of particles which have a diameter 0.7 to 1.3 times larger than the average particle size to all particles. The proportion is calculated by multiplying the average particle size by 0.7 to 1.3 and plotting the calculated value into a cumulative curve.

(Measurement of specific surface area)

The specific surface area is measured by MONOSORB (available from Yuasa Ionics Kabushiki Kaisha) according to a nitrogen adsorption method described in Analytical Chemistry, vol. 30, page 1387 (1985).

(Measurement of melt viscosity)

A mold having an inside diameter of 50 mm is charged with 210 g of the powder, the powder is gradually pressurized for about 30 seconds up to a final pressure of about 300 kg/cm$^2$, and the final pressure is maintained for another 5 minutes to get a preform. The preform is is taken out of the mold, and the temperature of the preform is raised at a rate of 50° C./h up to 365° C. in an air oven, and then after the temperature is maintained for 5.5 hours, the preform is cooled at a rate of 50° C./h down to room temperature to get a cylindrical sintered article A. This sintered article is skived along a side face to produce a 0.5 mm thick sheet B. Four to five mm wide and 15 mm long test pieces are cut from this sheet and the width and the thickness are measured correctly to calculate a cross section. Thermoflex TMA (Rigaku DenkiKabushiki Kaisha) is used. Clamping molds are attached on both ends of the test piece such that a distance between two clamping portion is 1 cm. This mold-test piece assembly is put in the cylindrical furnance, heated at a rate of 20° C./min from room temperature to 380° C., and after maintaining this temperature for 5 minutes, a load of about 15 g is applied. An elongation during 60 minutes from 60 minutes after the application of the load to 120 minutes after is measured from a curve showing a change of the elongation with laps of time. The proportion of the elongation (dL$_T$/dT) against time (60 minutes) is calculated. A melt viscosity ($\eta$) is defined in the following eqation.

$$\eta = W \times L_T \times g / 3 \times (dL_T/dT) \times A_T$$

W: tension load (g)

L$_T$: length (cm) of the test piece at 380° C. (longer than that at room temperature by about 8%)

A$_T$: cross section of the test piece at 380° C. (larger than that at room temperature by about 37%)

g: gravitational constant (980 cm/sec$^2$)

(Measurement of heat of crystallization by differential scanning calorimeter (DSC))

Figure 1:
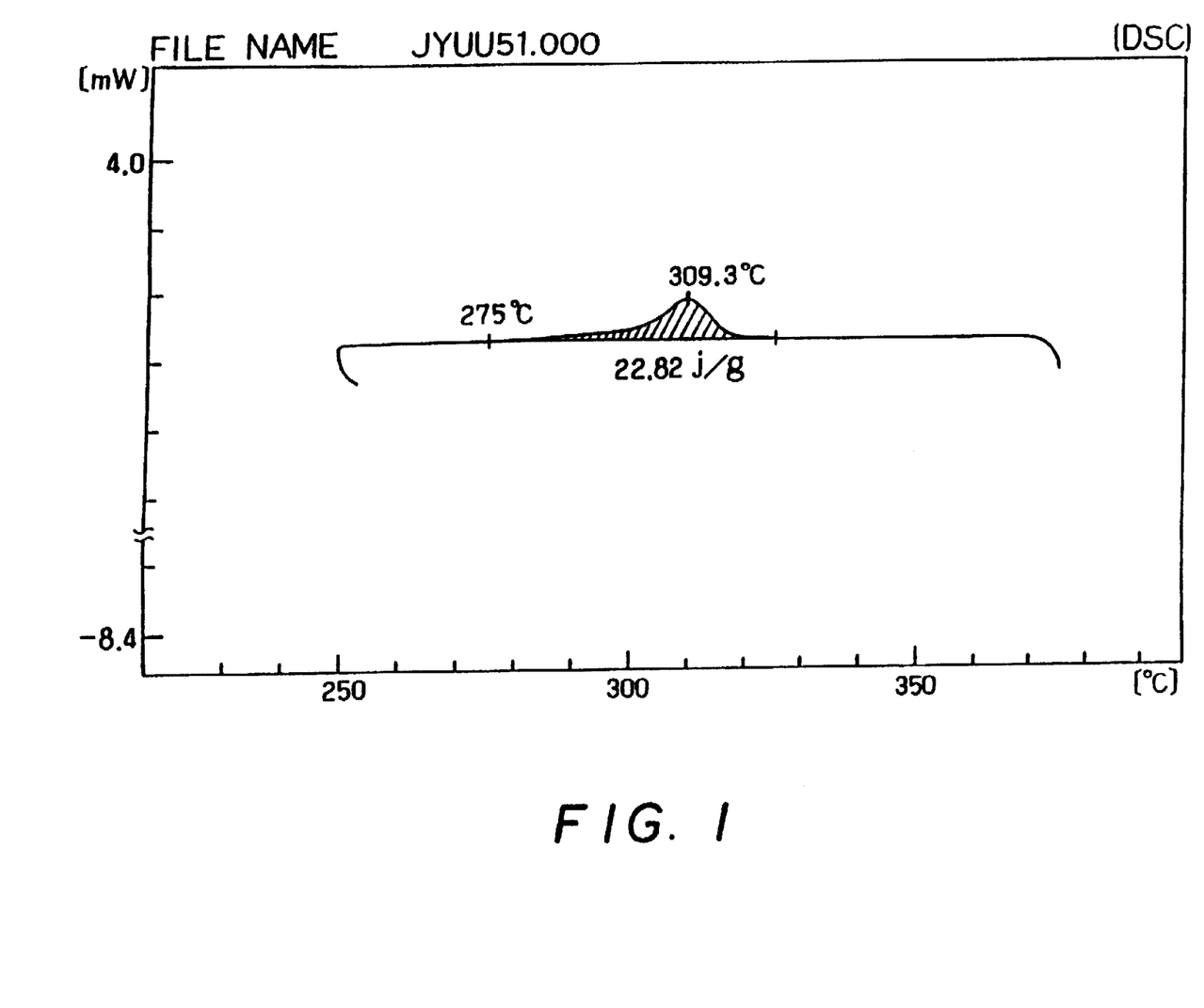
FIG. 1 is an explanation view showing a method to find a heat of crystallization from a DSC chart of a differential scanning calorimeter adopted in the present invention.

About 3 mg of the unsintered powder is weighed precisely, put in the special aluminium pan, and measurement is carried out by DSC(DSC-50 of Shimadzu Corporation). First, the aluminium pan is heated to 250° C. under a N$_2$ atomosphere. After maintained at the temperature, and then the pan is heated to 380° C. at a rate of 10° C./min to sufficiently melt the crystal. Then, the pan is cooled from 380° C. to 250° C. at a rate of 10° C./min, and the heat of crystallization point is measured. As shown in FIG. 1, a tangential line is drawn from a point of 275° C. to another end of the peak. An area surrounded by the curve of the peak and the tangential line gives a value of the heat of crystallization. FIG. 1 corresponds to Example 3.

(Measurement of flex life)

A 6.5 mm wide and 14 cm long test piece is cut away from the sheet B produced in the Measurement of melt viscosity. The number of times of double bending at break of the test piece by applying a tension of 1.2 kg to the test piece is measured, by means of the MIT testing machine described in ASTM D2176-63T.

(Measurement of creep resistance)

From the cylindrical sintered article A produced in Measurement of melt viscosity, a test piece having a diameter of 11.3 mm and a height of 10 mm is cut away along a direction parallel to the pressurizing direction. To the test piece is applied a load of 70 kgf/cm$^2$ at 200° C. according to ASTM D621. Deformation after retention of 24 hours is defined as total deformation. And, after releasing the load and allowing to stand for another 24 hours at 200° C., deformation as compared with a length of the original test piece is defined as permanent deformation. Creep resistance at 25° C. is measured in the same way as that at 200° C. except that a load is 140 kgf/cm$^2$.

(Measurement of welding factor)

Welding factor is measured according to the method disclosed in JP-B-39105/1991.

A mold having an inside diameter of 50 mm is charged with 185 g of the pelletized molding powder, and the powder is gradually compressed for about 30 seconds to a final pressure of about 150 kg/cm$^2$, and then the final pressure is maintained for mother 5 minutes to get a preform having a diameter of 50 mm and a length of 45 mm.

Each of the cylindrical articles is sintered in a glass tube of 53 mm diameter without loading, as follows:

The sintered article is heated up from 20° to 380° C. at a linear rate of 45° C./h, this temperature being maintained for 4 hours, then cooled to 20° C. at a linear rate of 45° C./h. This sintering and cooling process is repeated. The welding material obtained in this way is rotated to be cut to give a test specimen having a diameter of 20 mm in the center (outside the region of clamping). In the same way, comparison specimens which are not welded (i.e. are compression molded from the outset in the full length of 90 mm) are prepared. These test specimens are subjected to a tensile test in order to determine the tensile strength at break, following the guidelines of DIN Standard 53,455 and working at a drawing speed of 30 mm/min. The welding factor is the quotient of the tensile force at break of the welded sample, divided by the tensile force at break of the non-welded sample.

(Pore count)

A mold having an inside diameter of 50 mm is charged with 210 g of the pelletized powder, the powder is gradually pressurized for about 30 seconds up to a final pressure of about 350 kg/cm$^2$, and the final pressure is maintained for another 5 minurtes to get a preform. The preform is taken out of the mold, and the temperature of the preform is raised at a rate of 45° C./h up to 380° C. in an air oven, and then after the temperature is maintained for 4 hours, the preform is cooled at a rate of 45° C./h down to room temperature to get a cylindrical sintered article. Then, a 0.2 mm thick sheet is skived from this sintered article. This skived sheet having a width of 50 mm and a thickness of 0.2 mm is passed through between the electrodes to which are applied a direct voltage of 5000 volts. The sheet is fed successively at a rate of 10 cm/sec by a roll, and the number of pores (electrically defects) per 1 m² of the sheet is measured. The upper electrodes are projecting like a reed screen, to touch a whole surface of the sheet (the substantially same condition as in a voltage is applied to the whole surface of the sheet). The number of pores are recorded by a computer.

(Measurement of SVI value)

SVI is measured according to the method described in ASTM 04895-89-10.9.

A mold having a diameter of 76 mm is charged with 29 g of the powder, and a molding pressure of 70 kgf/cm² is applied thereto and the pressure is maintained for 2 minutes. Then, the molding pressure is raised up to 140 kgf/cm², and the pressure is maintained for another 2 minutes. The obtained preform is taken out of the mold, and put in an air-electric furnace kept at 290° C. Then, the preform is heated up to 380° C. at a rate of 120° C./h, and after keeping the temperature at 380° C. for 30 minutes, the article is cooled down to 294° C. at a rate of 60° C./h. This temperature is maintained for 24 minutes, and the article is taken out of the furnance and air-cooled. From the molded article in a disc form obtained in this way, a test piece for the tensile test is punched out by using a micro dumbbell standardized by ASTM. Difference of specific gravities before and after the tensile test of this test piece is measured, and SVI is found by the equation described later. Here, the tensile test is carried out at a distance between chucks of 12.7 mm and an tensile rate of 5 mm/min, and a sample for mesuring a specific gravity is selected from the samples which have been broken at an elongation of 500%.

$$SVI = (\text{specific gravity before tensile test} - \text{specific gravity after tensile test}) \times 1000$$

(Measurement of abrasion resistance)

The composition for molding is compression-molded and sintered to get a cylindrical sintered article C in the same way as that of above-mentioned Measurement of melt viscosity except that a molding pressure is 500 kgf/cm². This sintered article C is cut out to get a sample (25.6 mmφ/20 mmφ/15 mm length) for Suzuki-Matsubara friction-abrasion tester. Suzuki-Matsubara friction-abrasion tester (Orientic Kabushiki Kaisha) is used to conduct friction-abrasion test under conditions that a material to be contact is an aluminium material (JIS 2024P), a load is 4 kgf/cm², a rate is 1 m/sec and a test time is 65 hours, to know a friction coefficient and an abrasion coefficient.

The abrasion coefficient is calculated according to the following equation:

$$K = W/(p \times v \times t)$$

Here, K is an abrasion coefficient, W is an abrasion amount (mm), p is a load (kgf/cm²), v is a rate (km/sec), t is a time (sec).

(Measurement of apparent density)

Apparent density is measured according to JIS K 6891-5.3.

(Measurement of tensile strength and elongation)

From the sheet B produced in Meaurement of melt viscosity, a test piece is punched out by using the dumbbell 3 standardized in JIS. The test piece is stretched at a rate of 200 mm/min by using an autograph of a total load of 500 kg according to JIS K6891-5.8, to measure a tensile strength and an elongation at break.

The present invention is explained by means of the following Examples. The present invention is not limited to the Examples.

EXAMPLE 1

A solution of 3.3 g of ammonium carbonate in 54.8 liters of deinoized water is charged in an autoclave of 170 liters, and stirred (110 r.p.m.) with an anchor type stirrer. After deaeration, the autoclave is charged with tetrafluoroethylene so as to be a pressure of 0.5 kg/cm² (gage pressure). After repeating this procedure three times, 85 g of perfluoro (propyl vinyl ether) is introduced under pressure of tetrafluoroethylene. After raising the temperature of reaction system to 50° C., tetrafluoroethylene is introduced under pressure until an internal pressure of the reaction system reaches 8 kg/cm². To this reaction system, 0.2 liter of an aqueous solution of 715 mg of ammonium persulfate (half-life at 55° C. is 46.3 hours. Decomposition amount of ammonium persulfate during three hours from the inintiation of polymerization is $1.2 \times 10^{-6}$ mole/liter of polymerization water at a polymerization temperature of 50° C.) is added to initiate the polymerization. The polymerization is carried out with continuosly introducing tetrafluoroethylene under pressure such that the internal pressure of the reaction system is maintained at 8 kg/cm², and is continued until 22.5% by weight of tetrafluoroethylene on the basis of the weight of the aqueous medium is consumed, then, the monomers are discharged. After cooling down to room temperature, the resulting polytetrafluoroethylene raw powder is taken out, and roughly pulverized. This crude powder is dried, and finely ground in a pulverizer to an average particle size of about 30 μm to obtain the polytetrafluoroethylene molding powder of the present invention.

The polymerization conditions are shown in Table 1, and the physical properties of the obtained polytetrafluoroethylene and the physical properties of the molded article made of this molding powder are shown in Table 2.

EXAMPLES 2 TO 7

The polymerization and pulverization are carried out in the same manner as in Example 1 under the polymerization conditions shown in Table 1 to obtain the polytetrafluoroethylene molding powders of the present invention, and the above various physical properties are measured. The results are shown in Table 2.

Comparative Examples 1 to 8

The polymerization and pulverization are carried out in the same manner as in Example 1 under the polymerization conditions shown in Table 1 to obtain the polytetrafluoroethylene molding powders for comparison, and the above various physical properties are measured. The results are shown in Table 2.

Comparative Examples 9 to 10

The above various physical properties of commercially available TFM- 1700 (Farbwerke Hoechst Aktien Gesellschaft) and TG-70J (Du pont-Mitsui Fluorochemicals Co., Ltd.) measured in the same manner in Comparative Examples 1 to 8. The results are shown in Table 2.

TABLE 1

| Polymerization condition | Example | | | | | | | Comparative example | | | | | | | |
|---|---|---|---|---|---|---|---|---|---|---|---|---|---|---|---|
| | 1 | 2 | 3 | 4 | 5 | 6 | 7 | 1 | 2 | 3 | 4 | 5 | 6 | 7 | 8 |
| Temperature (°C.) | 50 | 50 | 45 | 50 | 50 | 50 | 50 | 70 | 70 | 70 | 50 | 40 | 70 | 70 | 50 |
| Perfluoro (vinyl ether) | | | | | | | | | | | | | | | |
| Kind | PPVE[1] | PPVE | PPVE | PPVE | PPVE[2] | PPVE | PPVE | PPVE | PPVE | PPVE | PPVE | PPVE | PPVE | — | PPVE |
| Charge (g) | 85 | 85 | 85 | 85 | 280 | 85 | 55 | 85 | 85 | 85 | 85 | 85 | 280 | | 10 |
| Initiator | [4] | | | | | | | | | | | | | | |
| Kind | APS[3] | APS | APS | APS | APS | APS | APS | APS | APS | APS | APS | redox[4] | APS | APS | APS |
| Charge (mg) | 85 | 85 | 85 | 85 | 280 | 85 | 55 | 85 | 85 | 85 | 85 | 85 | 280 | | 10 |
| Dispersing[5] agent (g) | — | — | — | 0.4 | — | 4.0 | — | — | 0.4 | — | — | — | — | — | — |
| Polymerization time (hour) | 16.6 | 9.2 | 14.0 | 13.0 | 21.0 | 11.5 | 10.5 | 3.8 | 15.7 | 5.9 | 5.9 | 13.6 | 5.1 | 4.6 | 8.5 |

[1] perfluoro (n-propyl vinyl ether)
[2] perfluoro (2-propoxypropyl vinyl ehter)
[3] ammonium persulfate
[4] APS/Na$_2$SO$_3$
[5] ammonium perfluorooctanoate

TABLE 2

| Character | Example | | | | | | |
|---|---|---|---|---|---|---|---|
| | 1 | 2 | 3 | 4 | 5 | 6 | 7 |
| Physical properties of polymer | | | | | | | |
| Yield (kg) | 12.3 | 12.4 | 12.3 | 12.4 | 12.4 | 12.4 | 12.3 |
| Perfluoro(vinyl ether) content (% by weight) | 0.062 | 0.070 | 0.075 | 0.106 | 0.172 | 0.090 | 0.04 |
| Melt viscosity (poise × 10$^{10}$) | 5.1 | 4.7 | 5.0 | 0.82 | 5.3 | 0.60 | 7.1 |
| Specific surface area of powder (m$^2$/g) | 1.5 | — | — | 6.0 | — | 8.0 | 2.5 |
| Heat of melting (J/g) | 21.9 | 22.5 | 22.2 | 21.7 | 22.4 | 22.3 | 23.0 |
| Heat of crystallization (J/g) | 20.6 | 22.3 | 22.0 | 22.6 | 22.2 | 22.5 | 22.9 |
| Physical properties of sintered article | | | | | | | |
| Flex life (10$^4$ cycles) | 1540 | 1140 | 1580 | 1230 | 1480 | 1550 | 1410 |
| Creep resistance Load 140 kgf/cm$^2$ | | | | | | | |
| 25° C. total deformation (%) | 13.7 | 13.1 | 13.5 | 11.0 | 13.0 | 11.2 | 13.5 |
| 25° C. permanent deformation (%) | 4.5 | 4.5 | 4.6 | 4.4 | 4.7 | 4.3 | 4.8 |
| Load 70 kgf/cm$^2$ | | | | | | | |
| 200° C. total deformation | 18.1 | 17.8 | 18.0 | 12.7 | 17.9 | 13.0 | 18.0 |
| 200° C. permanent deformation (%) | 6.2 | 5.3 | 5.7 | 4.2 | 6.0 | 4.5 | 7.0 |
| Tensile strength (kgf/cm$^2$) | 411 | 420 | 405 | 370 | 405 | 365 | 458 |
| Elongation (%) | 408 | 415 | 410 | 366 | 410 | 370 | 405 |
| SVI | 38 | 48 | 36 | 40 | 37 | 36 | 40 |

| Character | Comparative Example | | | | | | | | | |
|---|---|---|---|---|---|---|---|---|---|---|
| | 1 | 2 | 3 | 4 | 5 | 6 | 7 | 8 | 9[6] | 10[7] |
| Physical properties of polymer | | | | | | | | | | |
| Yield (kg) | 12.4 | 12.4 | 12.4 | 12.3 | 12.4 | 12.4 | 12.4 | 12.4 | — | — |
| Perfluoro(vinyl ether) | 0.075 | 0.075 | 0.063 | 0.080 | 0.071 | 0.160 | None | 0.005 | 0.12 | 0.053 |

TABLE 2-continued

| | | | | | | | | | | |
|---|---|---|---|---|---|---|---|---|---|---|
| content (% by weight) | | | | | | | | | | |
| Melt viscosity (poise × 10¹⁰) | 2.3 | 4.0 | 0.51 | 4.0 | 2.1 | 3.9 | 15.9 | 9.0 | 2.3 | 1.1 |
| Specific surface area of powder (m²/g) | 2.7 | — | 5.0 | — | — | — | — | 3.0 | 2.7 | 3.3 |
| Heat of melting (J/g) | 28.7 | 26.5 | 31.8 | 26.8 | 28.0 | 27.2 | 22.3 | 22.8 | 29.3 | 30.0 |
| Heat of crystallization (J/g) | 27.7 | 25.8 | 32.2 | 26.2 | 27.3 | 26.4 | 22.4 | 22.6 | 28.3 | 28.7 |
| Physical properties of molded article | | | | | | | | | | |
| Flex life (10⁴ cycles) | 350 | 620 | 270 | 580 | 420 | 530 | 750 | 720 | 360 | 180 |
| Creep resistance Load 140 kgf/cm² | | | | | | | | | | |
| 25° C. total deformation (%) | 11.0 | 11.9 | 11.2 | 11.8 | 11.7 | 14.8 | 16.7 | 16.0 | 11.0 | 9.7 |
| 25° C. permanent deformation (%) | 5.9 | 3.9 | 4.5 | 4.0 | 4.8 | 3.5 | 9.7 | 8.0 | 3.1 | 5.0 |
| Load 70 kgf/cm² | | | | | | | | | | |
| 200° C. total deformation | 14.6 | 17.2 | 17.1 | 6.8 | 15.4 | 16.6 | 30.6 | 28.0 | 14.2 | 17.1 |
| 200° C. permanent deformation (%) | 4.4 | 4.4 | 5.5 | 5.0 | 4.5 | 5.0 | 19.3 | 15.0 | 3.7 | 6.2 |
| Tensile strength (kgf/cm²) | 362 | 390 | 291 | 395 | 385 | 405 | 471 | 450 | 430 | 435 |
| Elongation (%) | 498 | 456 | 540 | 444 | 470 | 450 | 393 | 405 | 470 | 440 |
| SVI | 62 | 53 | 65 | 55 | 60 | 58 | 270 | 210 | 70 | 76 |

[6] TFM-1700 (Farbwerke Hoechst Aktien Gesellschaft)
[7] TG-70J (Du pont-Mitsui Fluorochemicals)

EXAMPLE 8

2 kg of the polytetrafluoroethylene molding powder produced in Example 1 and 7 liters of water are charged in a stainless steel agglomeration vessel of 10 liters which a temperature inside the vessel is maintained at 25° C. After they are stirred for 2 minutes with using oar type stirrer at 600 r.p.m., 770 ml of trifluorotrichloroethane is added and the mixture is stirred for further 2 minutes. Then, the stirrer is replaced by blade type stirrer having cracking ability, and the stirring is carried out for 5 minutes at 2000 r.p.m. Then, the blade type stirrer are replaced again by the oar type stirrer, and the mixture is heated to 47° C. with stirring at 600 r.p.m. to vaporize and recover organic solvents. After cooling down to 30° C., the product is taken out and dried for 24 hours at 120° C.

The above various physical properties of the resulting pelletized powder are measured. The results are shown in Table 3.

EXAMPLE 9

The agglomeration is carried out in the same mariner as in Example 8 except adding 730 ml of trifluorotrichloroethane.

The above physical properties of the resulting pelletized powder is shown in Table 3.

EXAMPLE 10

The agglomeration is carried out in the same manner as in Example 8 except adding 780 ml of 1,3-dichloro-1,1,2,2,3-pentafluoropropane in place of 770 ml of trifluorotrichloroethane.

The above physical properties of the resulting pelletized powder is shown in Table 3.

Comparative Example 11

The agglomeration is carried out in the same manner as in Example 8 except using the polytetrafluoroethylene molding powder for comparison produced in Comparative Example 1.

The above physical properties of the resulting pelletized powder for comparison are shown in Table 3.

Comparative Example 12

The agglomeration is carried out in the same manner as in Example 9 except using the polytetrafluoroethylene molding powder for comparison obtained in Comparative Example 1.

The above physical properties of the resulting pelletized powder for comparison are shown in Table 3.

Comparative Example 13

The agglomeration is carried out in the same manner as in Example 8 except using the polytetrafluoroethylene molding powder for comparison obtained in Comparative Example 7.

The above physical properties of the resulting pelletized powder for comparison are shown in Table 3.

TABLE 3

| Physical properties | Example | | | Comparative Example | | |
|---|---|---|---|---|---|---|
| | 8 | 9 | 10 | 11 | 12 | 13 |
| Average particle size (μm) | 541 | 416 | 520 | 418 | 328 | 483 |
| Apparent density (g/cm$^3$) | 0.82 | 0.84 | 0.81 | 0.79 | 0.81 | 0.75 |
| Component 0.7 to 1.3 times larger than d$_{50}$ (% by weight) | 52.1 | 43.8 | 50.5 | 44.9 | 39.0 | 51.2 |
| Flex life (× 10$^4$ cycles) | 1050 | 1230 | 1110 | 150 | 170 | 430 |
| Welding factor | 0.92 | 0.93 | 0.91 | 0.98 | 0.99 | 0.51 |
| Number of pores (pore/m$^2$) | 40 | 36 | 39 | 38 | 37 | 61 |
| Creep resistance | | | | | | |
| Load 140 kgf/cm$^2$ | | | | | | |
| 25° C. total deformation (%) | 13.9 | 13.8 | 13.8 | 11.5 | 11.2 | 17.1 |
| 25° C. permanemt deformation (%) | 4.8 | 4.7 | 4.8 | 6.2 | 6.0 | 9.8 |
| Load 70 kgf/cm$^2$ | | | | | | |
| 200° C. total deformation (%) | 18.5 | 18.3 | 18.4 | 14.8 | 14.8 | 30.7 |
| 200° C. permanent deformation (%) | 6.5 | 6.3 | 6.6 | 4.7 | 4.5 | 19.5 |
| Tensile strength (kgf/cm$^2$) | 403 | 405 | 402 | 355 | 360 | 392 |
| Elongation (%) | 401 | 405 | 406 | 485 | 495 | 351 |
| SVI | 39 | 35 | 39 | 76 | 60 | 278 |

EXAMPLE 11

A specific PTFE molding powder having a low heat of crystallization produced in Example 1 and carbon fibers (diameter 7 μm, average fiber length 70 μm) are drymixed in a ratio by weight of 90/10 to obtain the molding composition of the present invention. This molding composition is molded by a compression molding method (final pressure is 500 kgf/cm$^2$ and maintained for 5 minutes), then sintered to produce a cylindrical molded article. An abrasion resistance (an abrasion coefficient, a friction coefficient), a creep resistance, a tensile strength and an elongation of this molded article are measured. The results are shown in Table 4.

EXAMPLE 12

The PTFE molding powder having a low heat of crystallization produced in Example 1 and glass fibers (diameter 11 μm, average fiber length 40 μm) are dry-mixed in a ratio by weight of 90/10 to obtain a molding composition. This composition is molded and sintered in the same manner as in Example 11, and physical properties of the sintered article are measured. The results are shown in Table 4.

EXAMPLE 13

The PTFE molding powder having a low heat of crystallization produced in Example 1, carbon fibers (diameter 7 μm, average fiber length 70 μm) and polyoxybenzoylpolyester (Econol®E-101S, Sumitomo Chemical Co., Ltd.) are dry-mixed in a ratio by weight of 80/5/15 to obtain a molding composition. This composition is molded and sintered in the same manner as in Example 11, and the above physical properties of the sintered article are measured. The results are shown in Table 4.

Comparative Example 14

The PTFE molding powder produced in Comparative Example 1 and carbon fibers are mixed in a ratio by weight of 90/10 in the same manner as in Example 11 to obtain a molding composition. This composition is molded and sintered in the same manner as in Example 11, and the above physical properties of the sintered article are measured. The results are shown in Table 4.

Comparative Example 15

The PTFE molding powder produced in Comparative Example 1 and glass fibers are mixed in a ratio by weight of 90/10 in the same manner as in Example 12 to obtain a molding composition. This composition is molded and sintered in the same manner as in Example 11, and the above physical properties of the sintered article are measured. The results are shown in Table 4.

Comparative Example 16

The PTFE molding powder produced in Comparative Example 7 and carbon fibers are mixed in a ratio by weight of 90/10 in the same manner as in Example 11 to obtain a molding composition. This composition is molded and sintered in the same manner as in Example 11, and the above physical properties of the sintered article are measured. The results are shown in Table 4.

Comparative Example 17

The PTFE molding powder produced in Comparative Example 7 and glass fibers are mixed in a ratio by weight of 90/10 in the same manner in Example 12 to obtain a molding composition. This composition is molded and sintered in the same manner as in Example 11, and the above physical properties of the sintered article are measured. The results are shown in Table 4.

TABLE 4

| Character | Example 11 | Example 12 | Example 13 | Comparative Example 14 | Comparative Example 15 | Comparative Example 16 | Comparative Example 17 |
|---|---|---|---|---|---|---|---|
| Physical properties of polymer | | | | | | | |
| Yield (kg) | 12.3 | 12.3 | 12.3 | 12.4 | 12.4 | 12.4 | 12.4 |
| Perfluoro(vinyl ether) content (% by weight) | 0.062 | 0.062 | 0.062 | 0.075 | 0.075 | None | None |
| Melt viscosity (poise × $10^{10}$) | 5.1 | 5.1 | 5.1 | 2.3 | 2.3 | 15.9 | 15.9 |
| Specific surface area of powder ($m^2/g$) | 1.5 | 1.5 | 1.5 | 2.7 | 2.7 | 1.7 | 1.7 |
| Heat of melting (J/g) | 21.9 | 21.9 | 21.9 | 28.7 | 28.7 | 22.2 | 22.2 |
| Heat of crystallization (J/g) | 20.6 | 20.6 | 20.6 | 27.7 | 27.7 | 22.4 | 22.4 |
| Physical properties of molded article | | | | | | | |
| Adhesion resistance | | | | | | | |
| Abrasion coefficient[1] (× $10^{-5}$) | 2.3 | 4.5 | 1.5 | 5.5 | 10.5 | 7.4 | 14.5 |
| Friction coefficient | 0.22 | 0.24 | 0.23 | 0.30 | 0.26 | 0.14 | 0.20 |
| Creep resistance | | | | | | | |
| Load 140 $kgf/cm^2$ | | | | | | | |
| 25° C. total deformation (%) | 6.2 | 7.1 | 4.6 | 5.9 | 6.9 | 9.4 | 12.4 |
| 25° C. permanent deformation (%) | 2.2 | 2.6 | 2.5 | 1.9 | 2.4 | 3.4 | 6.7 |
| Load 70 $kgf/cm^2$ | | | | | | | |
| 200° C. total deformation | 7.4 | 12.0 | 6.1 | 7.0 | 11.7 | 10.6 | 17.0 |
| 200° C. permanent deformation (%) | 2.5 | 4.8 | 3.1 | 2.1 | 4.5 | 3.7 | 7.3 |
| Tensile strength ($kgf/cm^2$) | 227 | 191 | 186 | 241 | 200 | 304 | 270 |
| Elongation (%) | 292 | 327 | 324 | 350 | 480 | 293 | 325 |

[1]Unit: $mm/km/kgf/cm^2$

EXAMPLE 14

A stainless steel agglomeration vessel of 10 liters is charged with 2 kg of the molding composition containing carbon fibers produced in Example 11 and 7 liters of water, a temperature inside the vessel being maintained at 25° C. After they are stirred for 2 minutes with using oar type Stirrer at 600 r.p.m., 700 ml of trifluorotrichloroethane is added and the mixture is stirred for further 2 minutes. Then, the stirrer is replaced by blade type stirrer having cracking ability, and stirring is carried out for 5 minutes at 2000 r.p.m. Then, the blade type stirrer are replaced again by the oar type stirrer, and the mixture is heated to 47° C. with stirring at 600 r.p.m. to vaporize and recover organic solvents. After cooling down to 30° C., the product is taken out and dried for 24 hours at 120° C.

The above various physical properties of the resulting molding pelletized powder containig carbon fibers are measured. The results are shown in Table 5.

EXAMPLE 15

The agglomeration is carried out in the same manner as in Example 14 with using 2 kg of the molding composition containing glass fibers produced in Example 12. The above various physical properties of the resulting molding pelletized powder containing glass fibers are measured. The results are shown in Table 5.

EXAMPLE 16

The molding composition produced in Example 13 is pelletized in the same manner as in Example 14. The above various physical properties of the resulting molding pelletized powder are measured. The resluts are shown in Table 5.

EXAMPLE 17

The agglomeration is carried out in the same manner as in Example 14 except using 2 kg of the molding composition containing carbon fibers produced in Example 11 and using as a solvent 720 ml of 1,3-dichloro-1,1,2,2,3-pentafluoropropane. The above various physical properties of the resulting pelletized powder containing carbon fibers are measured. The results are shown in Table 5.

EXAMPLE 18

The agglomeration is carried out in the same manner as in Example 14 except using 2 kg of the molding composition containing glass fibers produced in Example 12 and using as a solvent 720 ml of 1,1-dichloro-2,2,3,3,3-pentafluoropropane. The above various physical properties of the resulting pelletized powder containing glass fibers are measured. The results are shown in Table 5.

Comparative Example 18

The PTFE molding composition produced in Comparative Example 14 is pelletized in the same manner as in Example 14. The above various physical properties of the resulting pelletized powder containing carbon fibers are measured. The results are shown in Table 5.

Comparative Example 19

The PTFE molding composition produced in Comparative Example 15 is pelletized in the same manner in Example 14. The above various physical properties of the resulting pelletized powder containing glass fibers are measured. The resluts are shown in Table 5.

Comparative Example 20

The PTFE molding composition produced in Comparative Example 16 is pelletized in the same manner as in Example 14. The above various physical properties of the resulting pelletized powder containing carbon fibers are measured. The resluts are shown in Table 5.

Comparative Example 21

The PTFE molding composition produced in Comparative Example 17 is pelletized in the same manner as in Example 14. The above various physical properties of the resulting pelletized powder containing glass fibers are measured. The resluts are shown in Table 5.

6, the water-operation is carried out by bellows-pump, and bellows part is observed with eyes. The resluts are shown in Table 6.

TABLE 6

| Example | Molding powder | Bellows condition after operation |
| --- | --- | --- |
| Example 19 | Example 1 | No change |
| Example 20 | Example 3 | Slightly whity |
| Example 21 | Example 5 | No change |
| Example 22 | Example 8 | No change |
| Comparative Example 22 | Comparative Example 1 | Extremely whity |
| Comparative Example 23 | Comparative Example 7 | Whity |
| Comparative Example 24 | Comparative Example 11 | Extremely whity |

TABLE 5

| Physical properties | Example | | | | Comparative Example | | | | |
| --- | --- | --- | --- | --- | --- | --- | --- | --- | --- |
| | 14 | 14 | 16 | 17 | 18 | 18 | 19 | 20 | 21 |
| Average particle size (μm) | 520 | 481 | 392 | 505 | 492 | 405 | 385 | 462 | 450 |
| Apparent density | 0.75 | 0.77 | 0.71 | 0.73 | 0.76 | 0.73 | 0.77 | 0.74 | 0.73 |
| Component 0.7 to 1.3 times larger than $d_{50}$ (% by weight) | 53.5 | 43.5 | 87.4 | 56.1 | 57.2 | 46.2 | 40.5 | 48.5 | 47.3 |
| Welding factor | 0.75 | 0.81 | 0.53 | 0.76 | 0.80 | 0.85 | 0.90 | 0.64 | 0.71 |
| Number of pores (pore/m$^2$) | 105 | 1) | 152 | 102 | 1) | 98 | 1) | 122 | 1) |
| Abrasion resistance | | | | | | | | | |
| Abrasion coefficent (× 10$^{-5}$) | 2.8 | 4.7 | 1.4 | 2.7 | 4.7 | 5.6 | 10.6 | 7.5 | 14.7 |
| Friction coefficient | 0.25 | 0.26 | 0.23 | 0.26 | 0.25 | 0.31 | 0.28 | 0.15 | 0.21 |
| Creep resistance | | | | | | | | | |
| Load 140 kgf/cm$^2$ | | | | | | | | | |
| 25° C. total deformation (%) | 6.5 | 7.3 | 4.6 | 6.4 | 7.2 | 6.0 | 7.1 | 9.5 | 12.5 |
| 25° C. permanent deformation (%) | 2.3 | 2.8 | 2.6 | 2.2 | 2.8 | 2.1 | 2.6 | 3.4 | 6.7 |
| Load 70 kgf/cm$^2$ | | | | | | | | | |
| 200° C. total deformation (%) | 7.7 | 12.2 | 6.3 | 7.5 | 12.3 | 7.1 | 11.7 | 10.8 | 17.2 |
| 200° C. permanent deformation (%) | 2.8 | 5.0 | 3.1 | 2.7 | 5.0 | 2.1 | 4.7 | 3.7 | 7.4 |
| Tensile strength (kgf/cm$^2$) | 205 | 180 | 140 | 212 | 192 | 215 | 175 | 265 | 233 |
| Elongation (%) | 245 | 282 | 277 | 260 | 280 | 312 | 405 | 252 | 282 |

1)Innumerable number of pores are supposed to exist since current continuosly flowed during the measurement

EXAMPLE 19

Figure 2:
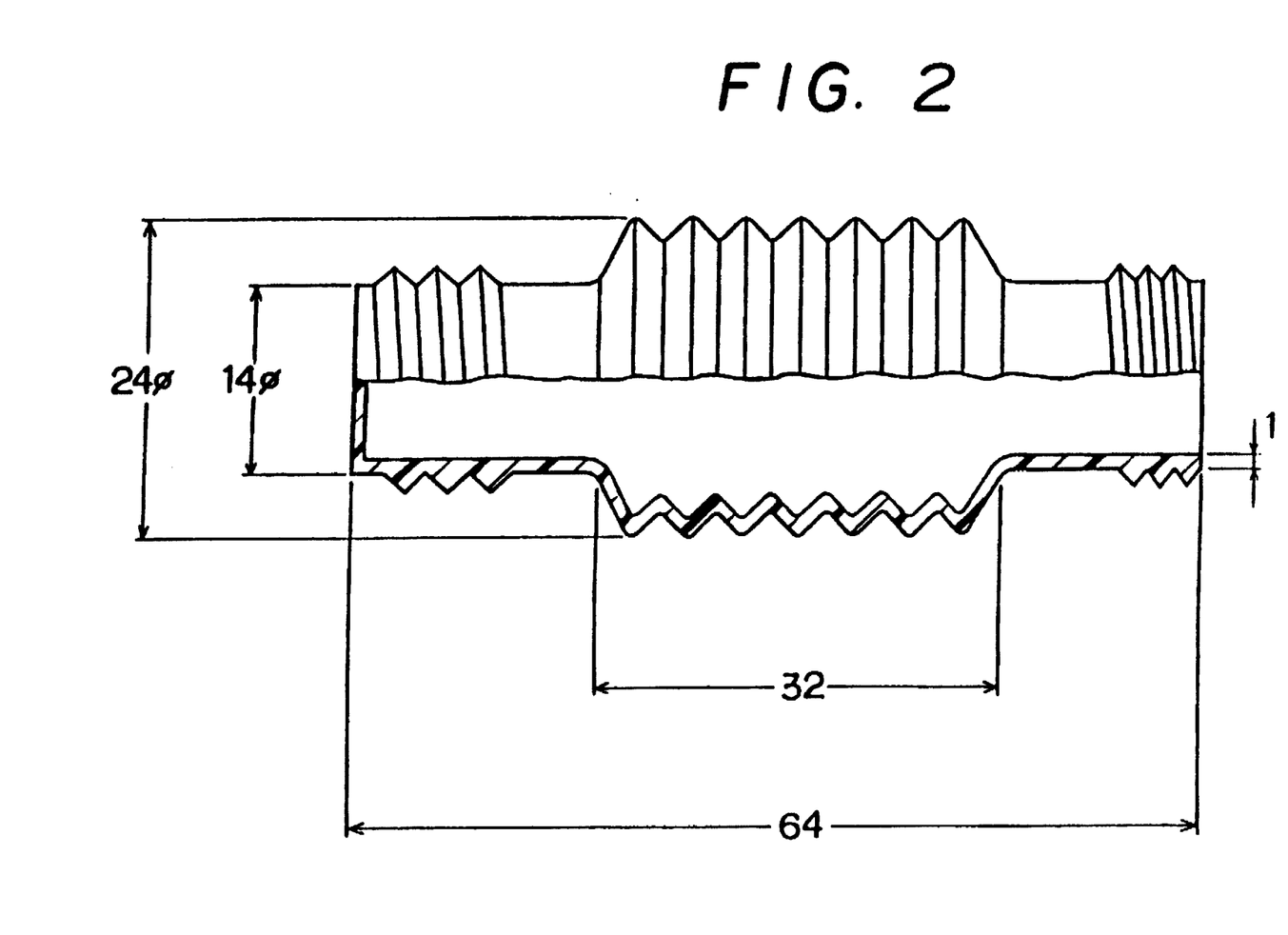
FIG. 2 is a schematic partially cut away longitudinal sectional view of a molded article produced in Examples 19 to 22 and Comparative Examples 22 to 24.

A mold having an internal diameter of 50 mm is charged with 320 g of the powder produced in the Production Example 1. The powder is gradually pressurized for about 30 seconds to a final pressure of 300 Jg/cm$^2$, and the final pressure is further maintained for 5 minutes to produce a preform. The preform is taken out of the mold, and heated at a rate of 50° C./h to 365° C. in an air oven. After maintaining the temperature for 5.5 hours, the sintered article is cooled down to room temperature at a rate of 50° C./h to produce a cylindrical sintered article. This sintered article is machined to obtain the molded article (bellows) shown in FIG. 2. This molded article is installed to a bellows-pump (2KBM-1ZU1, IWAKI CO. LTD), and a water-operation (32 r.p.m., discharge rate 75 ml/min) is carried out at 25° C. for 720 hours. Then, the bellows is detached from the pump, and bellows part is observed with eyes.

The results are shown in Table 6.

EXAMPLES 20 TO 22

Comparative Examples 22 to 24

A molded article is produced in the same manner in Example 19 except using molding powders shown in Table The polytetrafluoroethylene molding powder of the present invention provides molded articles which are excellent both in the creep resistance and the flex fatigue resistance (the flex life), and is extremely effective as a molding material for parts which are repeatedly bent such as bellows, diaphragm, pump and the like.

Industrial Applicability

Because of its excellent characteristics, the molding powder according to the present invention is useful as it is or after blending with the filler, as a raw material for molded articles for the following uses. For example, molded articles which need a flex resistance such as bellows, disphragm, hose, piston ring and butterfly valve; molded articles which need a creep resistance such as ball valve sheet, packing, gasket, piston ring, bellows, diaphragm and butterfly valve; molded articles which need a gas permeation resistance such as bellows, disphragm, hose, packing and gasket; and the like.

We claim:

1. A pelletized powder for molding made of a polytetrafluoroethylene molding powder that is not melt-processable and that has a specific surface area of 0.5 to 9.0 m$^2$/g and an average particle size of not more than 100 μm, the polytetrafluoroethylene comprising 0.01 to 1% by weight of a perfluoro(vinyl ether) unit having the general formula (I):

$$-CF_2-CF- \atop | \atop O-X \qquad (I)$$

wherein X is a perfluoroalkyl group having 1 to 6 carbon atoms or a perfluoroalkoxyalkyl group having 4 to 9 carbon atoms, and having a heat of crystallization of 18.0 to 25.0 J/g measured by a differential scanning calorimeter, wherein a molded article made of the powder has (a) a flex life of not less than 7 million cycles, (b) a creep resistance (total deformation) of not more than 20% at 200° C. and (c) a creep resistance (total deformation) of not more than 15% at 25° C., and wherein the pelletized powder has (a) an average particle size of 150 to 1000 µm, (b) an apparent density of 0.5 to 1.0 g/cm³, and (c) a particle size distribution in which not less than 30% by weight of the powder has a particle size 0.7 to 1.3 times larger than the average particle size, and a molded article made of from the (d) a flex life of not of less than 5 million cycles, and (e) a SVI of not more than 50.

2. A filler-containing polytetrafluoroethylene molding composition comprising a pelletized powder made of a mixture of a polytetrafluoroethylene molding powder that is not melt-processable and that has a specific surface area of 0.5 to 9.0 m²/g and an average particle size of not more than 100 µm and a filler in a ratio by weight of 99 to 20/80 to 1, the polytetrafluoroethylene comprising 0.01 to 1% by weight of a perfluoro(vinyl ether) unit having the general formula (I):

$$-CF_2-CF- \atop | \atop O-X \qquad (I)$$

wherein X is a perfluoroalkyl group having 1 to 6 carbon atoms or a perfluoroalkoxyalkyl group having 4 to 9 carbon atoms, and having a heat of crystallization of 18.0 to 25.0 J/g measured by a differential scanning calorimeter, wherein a molded article made of the powder has (a) a flex life of not less than 7 million cycles, (b) a creep resistance (total deformation) of not more than 20% at 200° C. and (c) a creep resistance (total deformation) of not more than 15% at 25° C., and wherein the pelletized powder has (a) an average particle size of 150 to 1000 µm, (b) an apparent density of 0.5 to 1.0 g/cm³, and (c) a particle distribution in which not less than 30% by weight of the powder has a particle size 0.7 to 1.3 times larger than the average particle size.

3. A pelletized powder for molding made of a polytetrafluoroethylene molding powder that is not melt-processable and that has a specific surface area of 0.5 to 9.0 m²/g and an average particle size of not more than 100 µm, the polytetrafluoroethylene comprising 0.01 to 1% by weight of a perfluoro(vinyl ether) unit having the general formula (I):

$$-CF_2-CF- \atop | \atop O-X \qquad (I)$$

wherein X is a perfluoroalkyl group having 1 to 6 carbon atoms or a perfluoroalkoxyalkyl group having 4 to 9 carbon atoms, and having a heat of crystallization of 18.0 to 25.0 J/g measured by a differential scanning calorimeter, wherein the molding powder is prepared by suspension-polymerizing tetrafluoroethylene and the perfluoro(vinyl ether) at a temperature of 40° to 55° C., wherein a molded article made of the powder has (a) a flex life of not less than 7 million cycles, (b) a creep resistance (total deformation) of not more than 20% at 200° C. and (c) a creep resistance (total deformation) of not more than 15% at 25° C., and wherein the pelletized powder has (a) an average particle size of 150 to 1000 µm, (b) an apparent density of 0.5 to 1.0 g/cm³, and (c) a particle size distribution in which not less than 30% by weight of the powder has a particle size 0.7 to 1.3 times larger than the average particle size, and a molded article made of from the pelletized powder has (d) a flex life of not of less than 5 million cycles, and (e) a SVI of not more than 50.

4. A filler-containing polytetrafluoroethylene molding composition comprising a pelletized powder made of a mixture of a polytetrafluoroethylene molding powder that is not melt-processable and that has a specific surface area of 0.5 to 9.0 m²/g and an average particle size of not more than 100 µm and a filler in a ratio by weight of 99 to 20/80 to 1, the polytetrafluoroethylene comprising 0.01 to 1% by weight of a perfluoro(vinyl ether) unit having the general formula (I):

$$-CF_2-CF- \atop | \atop O-X \qquad (I)$$

wherein X is a perfluoroalkyl group having 1 to 6 carbon atoms or a perfluoroalkoxyalkyl group having a heat of crystallization of 18.0 to 25.0 J/g measured by a differential scanning calorimeter, wherein the molding powder is prepared by suspension-polymerizing tetrafluoroethylene and the perfluoro(vinyl ether) at a temperature of 40° to 55° C., wherein a molded article made of the powder has (a) a flex life of not less than 7 million cycles, (b) a creep resistance (total deformation) of not more than 20% at 200° C. and (c) a creep resistance (total deformation) of not more than 15% at 25° C., and wherein the pelletized powder has (a) an average particle size of 150 to 1000 µm, (b) an apparent density of 0.5 to 1.0 g/cm³, and (c) a particle distribution in which not less than 30% by weight of the powder has a particle size 0.7 to 1.3 times larger than the average particle size.

5. The pelletized powder for molding of claim 1, wherein the pelletized powder has a particle size distribution in which 35 to 45% by weight of the powder has a particle size 0.7 to 1.3 times larger than the average particle size.

6. The filler-containing polytetrafluoroethylene molding composition of claim 2, wherein the pelletized powder has a particle size distribution in which 35 to 45% by weight of the powder has a particle size 0.7 to 1.3 times larger than the average particle size.

* * * * *